Figure 1:
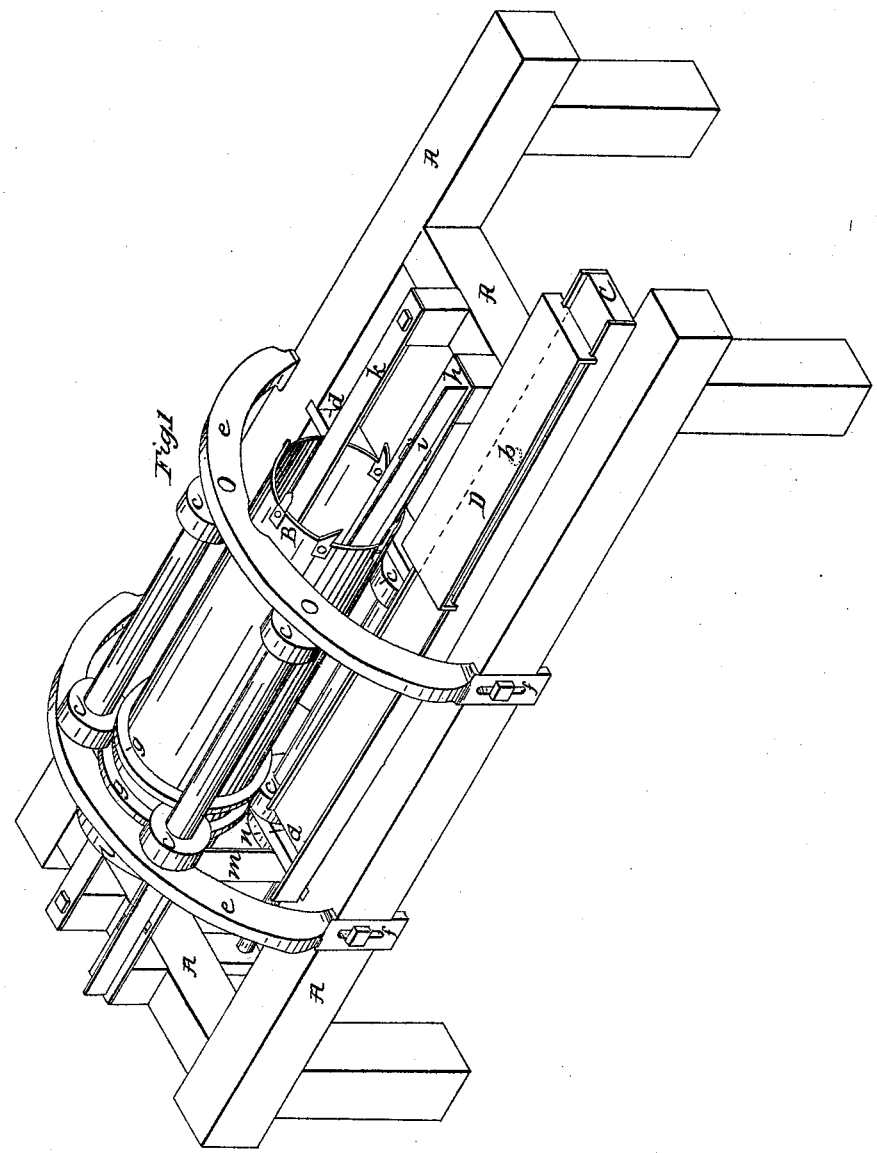

Deal & Greenman,
Making Staves.
N° 18,088. Patented Sep. 1, 1857.

2 Sheets, Sheet 1.

2 Sheets. Sheet 2.
Deal & Greenman,
Making Staves.
N° 18,088. Patented Sep. 1, 1857.
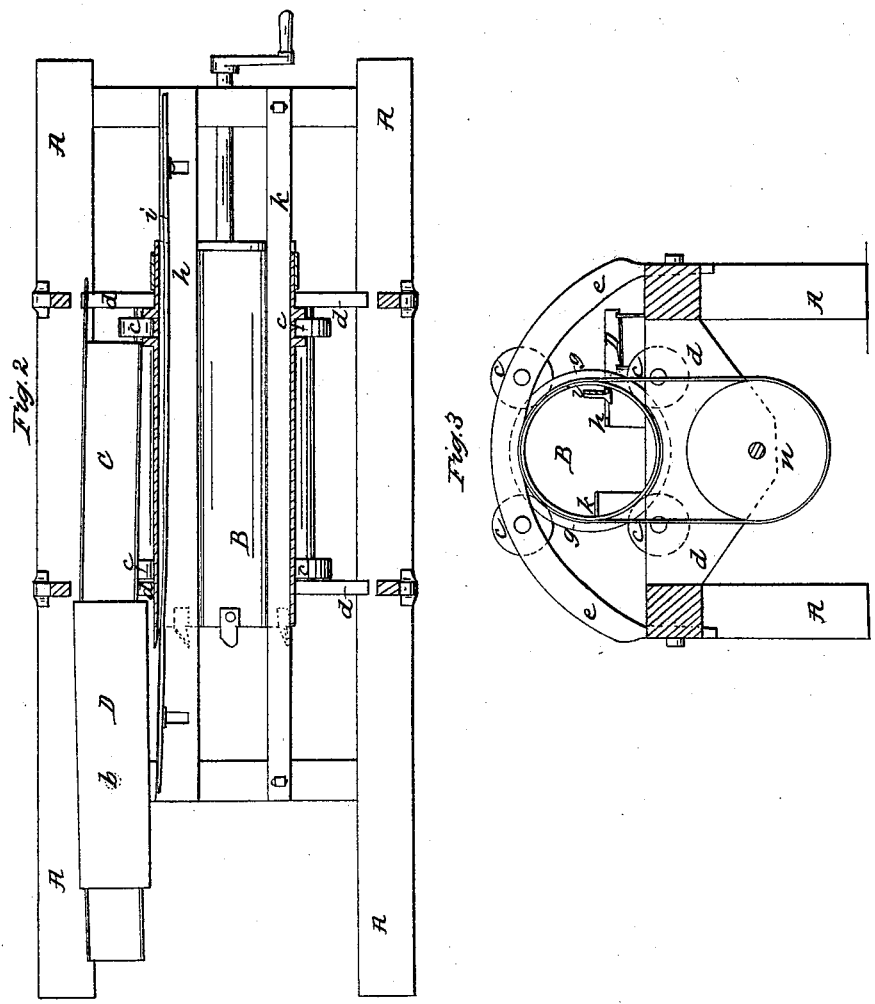

UNITED STATES PATENT OFFICE.

PETER DEAL, OF AMSTERDAM, AND JAMES GREENMAN, OF NORTHAMPTON, NEW YORK.

MACHINE FOR SAWING STAVES.

Specification of Letters Patent No. 18,088, dated September 1, 1857.

*To all whom it may concern:*

Be it known that we, PETER DEAL, of Amsterdam, in the county of Montgomery and State of New York, and JAMES GREENMAN, of Northampton, in the county of Fulton, in said State, have invented certain new and useful Improvements in Machines for Sawing Staves, of which the following is a full, clear, and exact description, reference being had to the accompanying drawing, making part of this specification, in which—

Figure 1 represents a perspective view of a machine for sawing staves, embracing our improvements, Fig. 2, represents a horizontal section through the same, and Fig. 3 an end elevation.

Our improvements relate to that class of machines for sawing staves, in which a cylindrical saw is used to sever the staves from the stock. This description of saws, although peculiarly well adapted to the economical manufacture of staves by their continuous cut, the high velocity at which they can be run and their giving to the staves the right degree of curvature without waste of material, have been but little used, owing to the difficulty experienced in properly sustaining and driving them. The modes heretofore adopted have been either to sustain and drive the cylindrical saw on and from the interior, to sustain it on the interior and drive it from the exterior, or to sustain and drive it on and from the exterior. These modes are all objectionable: the first from the liability of the saw to stop in passing through knots or hard material, as it is driven only by the adhesion of the supporting pulleys to the interior surface of the saw, and from its liability to be broken by saw-dust adhering to the interior surface of the saw and the surface of the pulleys or from chips wedging between the pulleys and the saw. Those saws supported on the interior by a single pulley of the same diameter as the interior of the saw or of a less diameter, and driven from the exterior by a band, are also clogged, strained and stopped by the accumulation of saw dust and chips between the pulley and saw. The toothed end of the saw also enlarges after being used a short time from the constant strain upon it while sawing, which enlargement causes the band to work toward that end and become entangled in the teeth, which soon cut it to pieces. In order to prevent the band from running on the teeth and the saw from working endwise, a toothed pinion working between the teeth with its points projecting above the exterior surface of the saw has been used. This device, instead of diminishing the tendency of the band to work toward the teeth, rather increases it, as the action of the pinion tends still further to enlarge the diameter of the saw at the toothed end and at the same time it raises a sharp bur on the sides and bottom of the teeth which cuts the band and from its projecting only a short distance above the teeth affords little or no resistance to the bands running on them. In those saws which are supported and driven from the exterior, the rear end is closed by a collar which attaches the saw to the driving shaft passing through its center. This closing of the rear end of the saw involves the necessity of drawing the stave or board from the saw at the forward end instead of discharging it through the saw at the rear. In order to do this the board is not sawed entirely from the stock by the saw, but is withdrawn with it, or, if it is severed from the stock the saw is stopped after each cut, in order to withdraw the board, thus involving either a waste of material or a loss of time. The chips and dust also accumulate in the interior of the saw as they can only be discharged at one end and are carried around by it and thrown into the kerf and between the saw and the board, causing the saw to bind in the kerf.

The object of our invention is to overcome the beforementioned obstacles in the use of cylindrical saws and our improvements consist, first, in supporting a cylindrical saw, open at both ends, by means of external friction rollers and driving it by means of a band passing around the exterior surface at a sufficient distance from the teeth not to be affected by the enlargement of its diameter at the toothed end, by which means the rear end of the saw is left open for the discharge of the staves after they are separated from the stock and the liability of the band to run on the teeth and be cut, is diminished; second, in supporting the stave while being sawed and preventing its falling to the lower side of the saw while being discharged therefrom, by means of a supporting table extending through the interior of the saw, in combination with an adjustable gage which performs also the function of a guard-rail to guide the stave through the saw, keeping it in a position to be carried forward and discharged without being turned by the succeeding staves; third, in preventing the saw-dust, chips, &c., which accumulate in the interior of the saw, from being carried around with it and thrown into the kerf of the stave and clogging the saw, by means of a guard in the interior of the saw on the side opposite the table; fourth, in pivoting the back just forward of the saw, so that it is free to turn laterally, by which means the binding of the concave surface of the stock or stave, against the surface of the saw is lessened and the liability of springing the saw is much diminished.

The accompanying drawings represent a stave-machine embracing our improvements.

A strong rectangular frame (A), forms a support for the saw (B) and the other parts of the machine. The saw (B) is mounted on friction rollers (c) which support it on its exterior within a short distance of each end. The bearings of the shafts of the under rollers are in girts (d) attached to the inside of the frame (A) while the bearings of the shafts of the upper rollers are formed in curved ribs (e) extending over the upper surface of the saw and attached to the outside of the frame by bolts passing through a longitudinal slot (f) in the lower end of the rib (e) which admits of these ribs being adjusted in order to vary the pressure of the upper rollers upon the cylinder. Sufficient space is left between these ribs (e) and the saw (B) on both sides for a curved track (C) on which a carriage (D) for the support of the stock traverses. This track is pivoted at a point (b) just in front of the saw, on which point it is turned as a center, by the forward end of the stock which, as it advances presses against the periphery of the saw and throws the track out, thus relieving the saw from the pressure of the concave surface of the stock except at two points, thereby diminishing the liability of springing the saw. The point at which the track is pivoted may be varied by placing it directly opposite the point of the teeth of the saw and on the side of the track next the saw so that the swinging of the track will not vary the thickness of the stave at different parts. A counterweight or spring may be used to press the track toward the saw that it may regain its position as the stock is drawn back. An automatic movement may be given to the carriage and also to the stock on the carriage, if thought proper.

Two flanges (g) whose distance apart is equal to the width of the rear friction rollers, are attached to the exterior surface of the saw perpendicularly and transversely to its axis; between these flanges the rear friction rollers turn and prevent the saw from vibrating endwise.

A table (h) passing through the interior of the saw at the same level and on the same side as the carriage, forms a support for the staves while being sawed and discharged. An adjustable gage (i) attached to this table serves to regulate the thickness of the stave and also performs the function of a guide or fender to prevent the stave from being thrown from the table while being carried forward to be discharged from the saw. A guard-plate (k) on the opposite side of the interior of the saw and at the same level as the table (h) acts as a guard or scraper to prevent the dust and chips from being carried around by the saw and thrown into the kerf of the stock while being cut. That part of the saw in rear of the flanges (g) forms the pulley (l) around which the driving-band (m) passes. This band derives its motion from a pulley (n) attached to a shaft beneath the saw.

It will be seen that owing to the manner in which the saw is supported and driven there is no liability of the saw dust and chips clogging the supporting rollers, and thereby stopping the saw and endangering its breaking, and that the stave can be sawed free of the stock and discharged at the rear end of the saw, and also that the band is not liable to be cut by the saw teeth. From these advantages which are derived from this arrangement of supporting and driving the saws, the rapidity, facility and consequent cheapness with which staves can be manufactured with this class of machines is greatly increased.

We do not confine ourselves to driving a saw from its exterior by a band as a toothed pinion running in openings made in the rear end of the saw may be substituted therefor and still leave the rear end open. The supporting table may also extend across the saw and from the guard to prevent the dust and chips from being carried around by the saw.

Having thus described our improvements in machines for sawing staves what we claim as new therein and desire to secure by Letters Patent is—

1. The combined method of supporting and driving cylindrical saws from their periphery in the manner and for the purpose described.

2. The arrangement on the interior of a cylindrical saw of a supporting table and an adjustable gage or guide as described, by which the thickness of the stave is gaged, and it is guided during its passage through the saw, and one stave is prevented from passing each other and jamming against and stopping the saws or throwing the front stave off the side of the table on the bottom of the saws.

3. The arrangement of a guard plate on the interior of a cylindrical saw as described for the purpose of preventing the saw dust and chips being thrown into the kerf of the stave.

4. The method of diminishing the pressure of the curved surface of the stock against the periphery of a cylindrical saw, by pivoting the track, on which the carriage holding the stock traverses, so that the pressure of the forward end of the stock will throw the track outward and thus prevent the saw from binding in the kerf.

In testimony whereof we have hereunto subscribed our names.

PETER DEAL.
JAMES GREENMAN.

In presence of—
 JOHN CASE,
 PETER CREIGHTON.